United States Patent
Yamada et al.

(10) Patent No.: US 6,554,461 B2
(45) Date of Patent: Apr. 29, 2003

(54) VEHICLE LAMP

(75) Inventors: Kenji Yamada, Shizuoka (JP); Norihiro Nishitani, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/116,018

(22) Filed: Apr. 3, 2002

(65) Prior Publication Data

US 2002/0145881 A1 Oct. 10, 2002

(30) Foreign Application Priority Data

Apr. 4, 2001 (JP) .................................. P.2001-105920

(51) Int. Cl.[7] .......................................... F21W 101/10
(52) U.S. Cl. ...................... 362/546; 362/507; 362/370; 362/368
(58) Field of Search ................................. 362/549, 546, 362/507, 362, 368, 370

(56) References Cited

U.S. PATENT DOCUMENTS

| | | | | |
|---|---|---|---|---|
| 5,496,006 A | * | 3/1996 | Kulka et al. ................. 362/61 |
| 5,765,935 A | * | 6/1998 | Katsumata et al. ........... 362/66 |
| 5,904,416 A | * | 5/1999 | Muller ....................... 362/288 |
| 6,120,170 A | * | 9/2000 | Hamelbeck ................. 362/549 |
| 6,135,319 A | * | 10/2000 | Camacho et al. ........... 362/288 |
| 6,257,749 B1 | | 7/2001 | Ward et al. ................. 362/549 |
| 6,332,697 B2 | * | 12/2001 | Soga et al. ................. 362/368 |
| 6,390,658 B2 | * | 5/2002 | Maeda ....................... 362/546 |
| 6,471,386 B2 | * | 10/2002 | Oh ............................. 362/549 |

* cited by examiner

Primary Examiner—Laura K. Tso
(74) Attorney, Agent, or Firm—Koda & Androlia (57) ABSTRACT

A vehicle lamp including a synthetic resin lamp body, a bracket that projects from an exterior surface of the lamp body and functions as a fixation portion to be fixed to a vehicle body, an adjacent lamp and the like, and a boss which is provided near the bracket and is used for attaching a replacement bracket thereon so as to replace the bracket when the bracket is damaged, the boss having a boss hole formed therein so that a tapping screw is pressed and screwed into the boss hole; and in this vehicle lamp, the boss hole is a shallow recess, and its bore diameter gradually increases toward its opening end.

20 Claims, 8 Drawing Sheets

VEHICLE LAMP

BACKGROUND OF THE INVENTION

1. Field of the Invention

The present invention relates to a vehicle lamp and more particularly to a vehicle lamp provided with a bracket that projects on a synthetic resin lamp body so that the lamp is mounted on a vehicle body, an adjacent lamp and the like.

2. Prior Art

In one type of vehicle lamp disclosed in, for instance, U.S. Pat. No. 6,257,749, a bracket and a boss are formed on the exterior surface of the lamp body. The bracket projects on the lamp body, that is typically a synthetic resin made, so as to function as a fixation portion that is fixed to a vehicle body, an adjacent lamp, and the like. The boss is provided near the bracket. The boss is used for attaching a replacement bracket thereto so that in case the bracket is damaged the replacement bracket is replaced with such a damaged bracket. The replacement bracket is attached to the boss by screwing a tapping screw into the boss hole.

When, for instance, a vehicle collision occurs but the lamp body remains undamaged and only the bracket is damaged, then the damaged bracket is removed, a replacement bracket is attached to the boss, and thus the undamaged lamp body is mounted back on the vehicle. It is thus unnecessary to replace the entire vehicle lamp.

However, in this prior art vehicle lamp body, the boss hole that is provided in the boss and into which the tapping screw is screwed, is narrow and deep and thus has several problems.

First, the boss hole can be easily clogged with mud, gravel, duet and the like. When the boss hole is thus clogged, then it is difficult to remove the clogged mud, gravel, duet and the like. As a result, it is impossible to sufficiently screw the tapping screw into the boss hole; and the attachment strength of the replacement bracket becomes insufficient.

Second, the boss for attaching the replacement bracket is generally formed after the design of a lamp body is completed, the portions that can be easily damaged are identified through tests using a prototype formed with a metallic mold, and concave portions or pins are formed in the metallic mold according to design changes. However, the process of providing the thin and long pin for forming the boss hole in the metallic mold is troublesome. Thus, a great amount of energy is required to provide the boss that may not be used in the future, and the cost of the vehicle lamp becomes relatively high. In addition, because of the structure of the metallic mold, the positions where the long pin for forming the boss hole can be provided are limited. Therefore, the boss is not always formed at an appropriate position, and a sufficient high attachment strength for the replacement bracket may not be obtained.

SUMMARY OF THE INVENTION

Accordingly, the inventors of the present application formed a shallow boss hole that has a bore diameter that gradually increases from the bottom to the open end, and the inventors found that such a shallow boss hole is effective for solving the various problems seen in the prior art structures.

Moreover, the inventors found that when a tapping screw that has a sharp end is screwed into the shallow boss hole, no crack occurs in the boss and the attachment strength of the replacement bracket is not greatly reduced even when whitening due to plastic deformation occurs in the boss.

The present invention is made in view of the above-described problems with the prior art and based on the above-described findings made by the inventors.

Accordingly, an object of the present invention is to provide a vehicle lamp in which a boss hole provided in a boss for attaching a replacement bracket is formed so as to have a small depth, thereby preventing the boss hole from being clogged with water, mud, gravel and the like, eliminating the use of complicated metallic mold for forming a lamp body and reducing the positional restrictions in forming the boss.

The above object is accomplished by a unique structure for a vehicle lamp of the present invention that includes a bracket and a boss, in which the bracket is projects from the exterior surface of a synthetic resin lamp body and functions as a fixation portion to be fixed to a vehicle body, an adjacent lamp, and the like; and the boss is provided in the vicinity of the bracket of the lamp body so as to be used for attaching a replacement bracket thereon that is to be replaced with a damaged bracket, the boss being formed with a boss hole or a recess into which a tapping screw is pressed and screwed, wherein the boss hole or the recess has a small depth, and the bore diameter gradually increases from the bottom toward its open end.

Conceivable shapes of the boss hole include, for example, a conical shape, a truncated conical shape, and a mortar-like shape. Since the depth of the boss hole is small, and the bore diameter of the boss hole gradually increases toward the open end, the boss hole is not easily clogged with mud, gravel, dust, and the like. Also, since a long pin for forming a boss hole does not need to be provided in the metallic mold, positional restrictions in forming the boss are small, and the boss (and boss hole) having a high strength can be formed at an optimal position.

When a tapping screw is installed, the screw is guided by the inner peripheral surface of the boss hole that has a bore diameter which gradually changes (or decrease toward the bottom of the boss hole), and the tip end of the tapping screw is easily aligned with the center of the boss hole. Thus, when the tapping screw having a sharp end is screwed into the thus formed shallow boss hole, the tapping screw is pressed and screwed straight into the boss. Also, no crack would occur in the boss, and the attachment strength of the replacement bracket is not greatly reduced even when whitening due to plastic deformation occurs in the boss.

In the present invention, the boss hole can be in a conical shape.

The conical boss hole is not easily clogged with mud, gravel, dust, and the like. When the tapping screw is inserted into the conical boss hole, the tip end of the tapping screw is guided by the side wall of the boss hole, and the center of the tapping screw is aligned with the center of the boss hole. Moreover, for forming such a boss hole of a conical shape, it is only necessary to form a conical projection in the metallic mold; and such a conical projection can be easily formed by, for example, welding.

More specifically, in the present invention, the ratio H/D is set to be in the range of $\frac{1}{4} < H/D < \frac{3}{2}$ when H is the depth of the boss hole, and D is the bore diameter of the boss hole.

When the ratio H/D is smaller than $\frac{1}{4}$, the tip end of the tapping screw is not efficiently guided into the center of the boss hole. On the other hand, when the ratio H/D is greater than $\frac{3}{2}$, then the boss hole is easily clogged with water, gravel, mud, and the like; and also, it is difficult to form a projection (for forming such a boss hole having the H/D ratio that is greater than $\frac{3}{2}$) in the metallic mold that is used for molding the lamp body.

Furthermore, in the present invention, a taper angle θ of the inner peripheral surface of the boss hole is set to a value in the range of 20 degrees<θ<60 degrees.

When the taper angle θ of the boss hole inner peripheral surface is smaller than 20 degrees, the boss hole is easily clogged. On the other hand, when the taper angle θ is larger than 60 degrees, then the function to guide the end of the tapping screw into the center of the boss hole deteriorates.

Also, in the present invention, the bracket is formed at its base end with horizontal ribs that stand on the lamp body and extend horizontally, and the replacement bracket is formed with a slit that is engageable with the horizontal rib of the bracket, so that the replacement bracket is attached to the boss with the slit being engaged with the horizontal rib.

When the replacement bracket is attached to the boss formed on the lamp body, the slit of the replacement bracket is brought to engage with the horizontal rib formed on the lamp body. Thus, the portion of the replacement bracket that has the slit supports the lamp weight load; and the lamp weight load imposed on the fixation portion of the replacement bracket that is to be fixed to the boss with the tapping screw is reduced.

In addition, in the present invention, the slit is formed in the replacement bracket so as to be located between the base end portion that is attached to the boss of the lamp body and the front end portion that is fixed to the vehicle body.

In this structure, when the replacement bracket is attached to the boss, the slit of the replacement bracket, which is engaged with the horizontal rib of the lamp body, is between the fixation portion attached to the boss and the fixation portion fixed to the vehicle body. This arrangement reduces further the lamp weight load imposed on the fixation portion of the replacement bracket attached to the boss with the tapping screw. More specifically, the slit of the replacement bracket is provided at a closer position to the fixation portion (the front end portion) that is fixed to the vehicle than to the fixation portion (the base end portion) to be fixed to the boss. Therefore, the lamp weight load imposed on the fixation portion (the base end portion) fixed to the boss is less than the lamp weight load imposed on the slit.

DETAILED DESCRIPTION OF THE INVENTION

The present invention will be described below with reference to the accompanying drawings.

Figure 1:
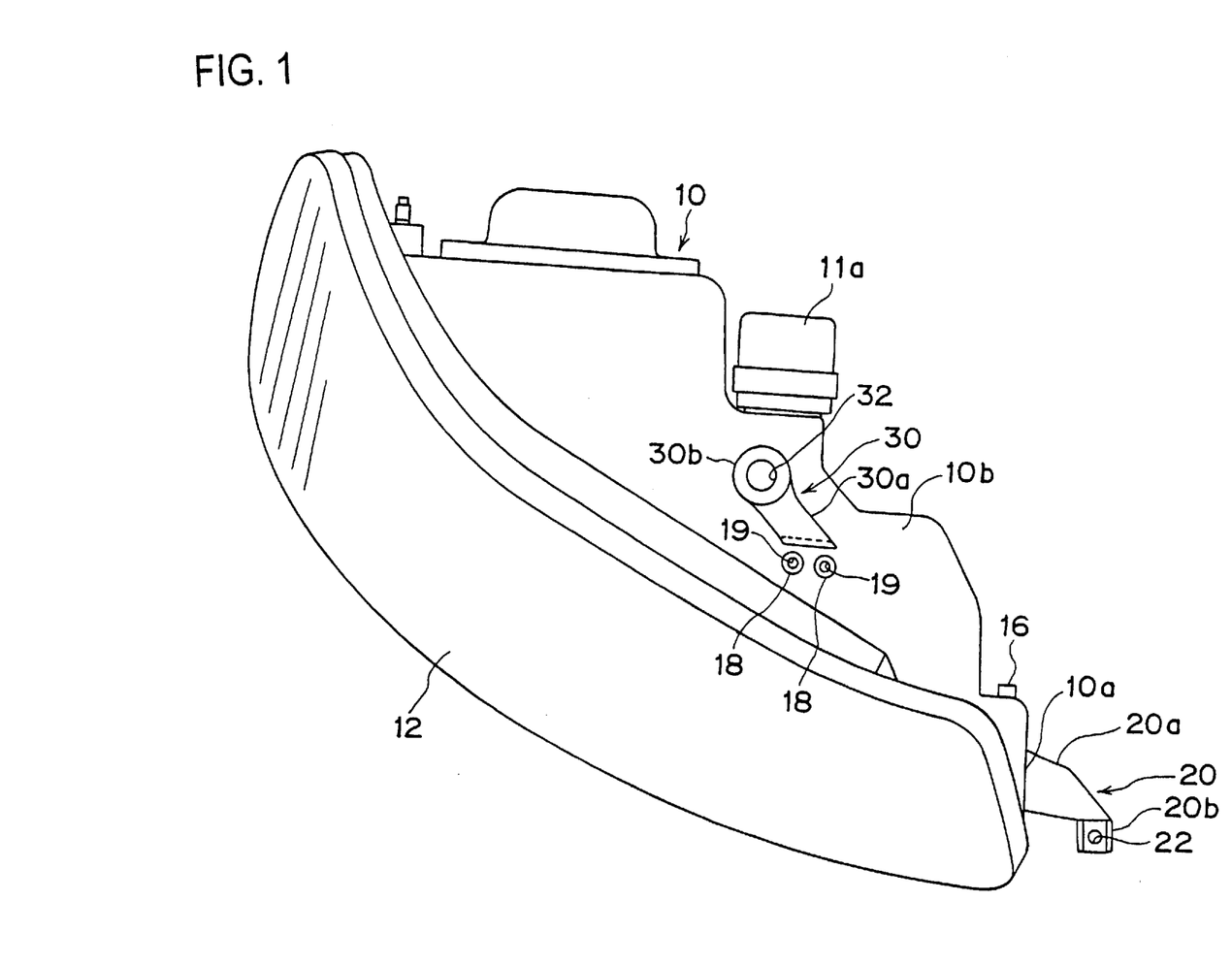
FIG. 1 is a top view of the vehicle headlamp according to the first embodiment of the present invention.
Figure 2:
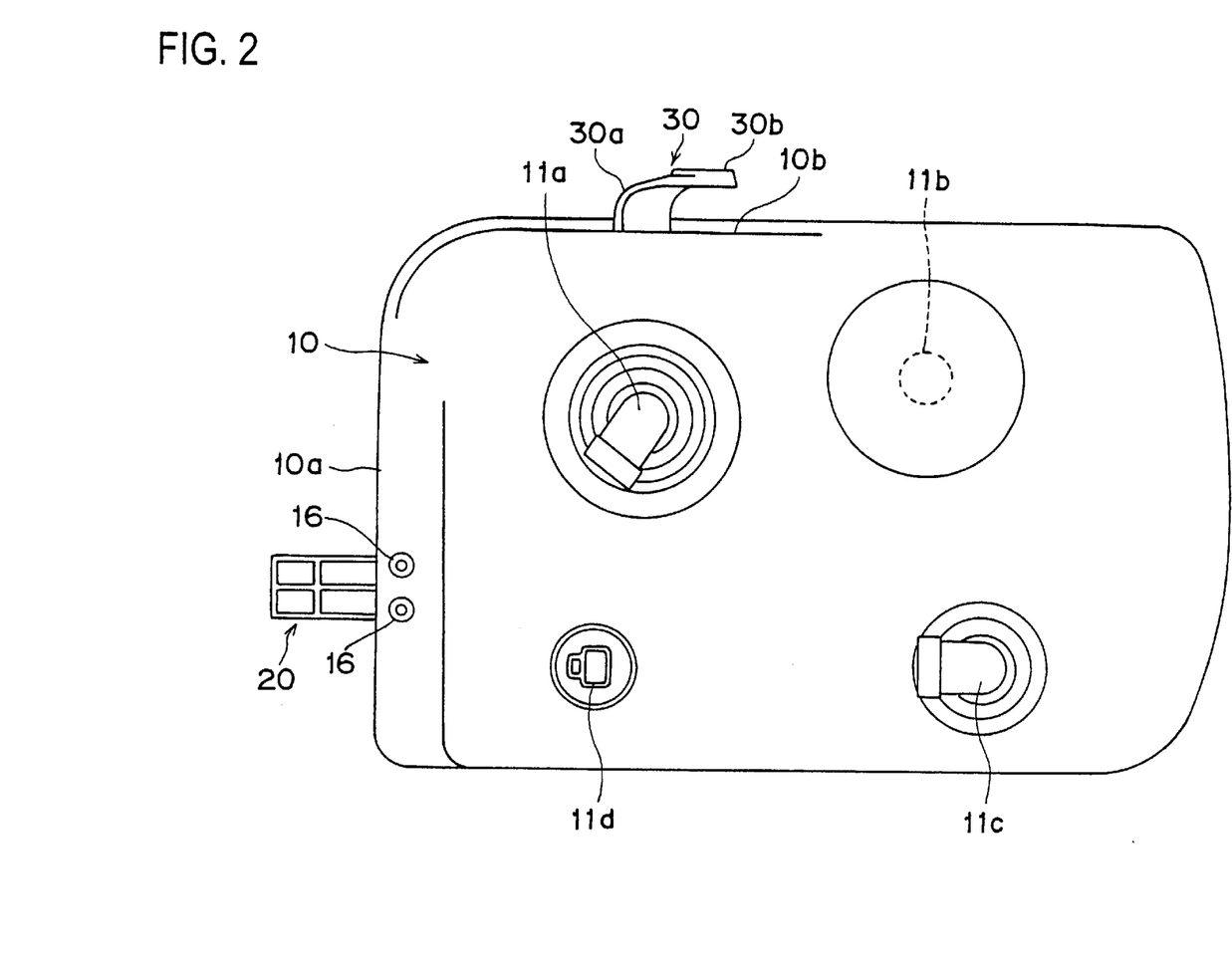
FIG. 2 is a rear view thereof.

The reference numeral 10 denotes a synthetic resin (such as polypropylene) lamp body that has an opening on its front side. The lamp body 10 houses, as seen from FIGS. 1 and 2, bulbs 11a and 11b that are the light sources for the headlamp, a bulb 11c that is a light source for a fog lamp, and a bulb 11d that is a light source for a clearance lamp. A front face lens 12 is fitted to the front opening of the lamp body 10.

First and second brackets 20 and 30 for fixing the headlamp (lamp body 10) to a vehicle body 100 are provided on the right sidewall 10a (the right sidewall in the front view of the headlamp) and an upper wall 10b of the lamp body 10, respectively. The brackets 20 and 30 are integrally formed with the lamp body 10.

Figure 4:
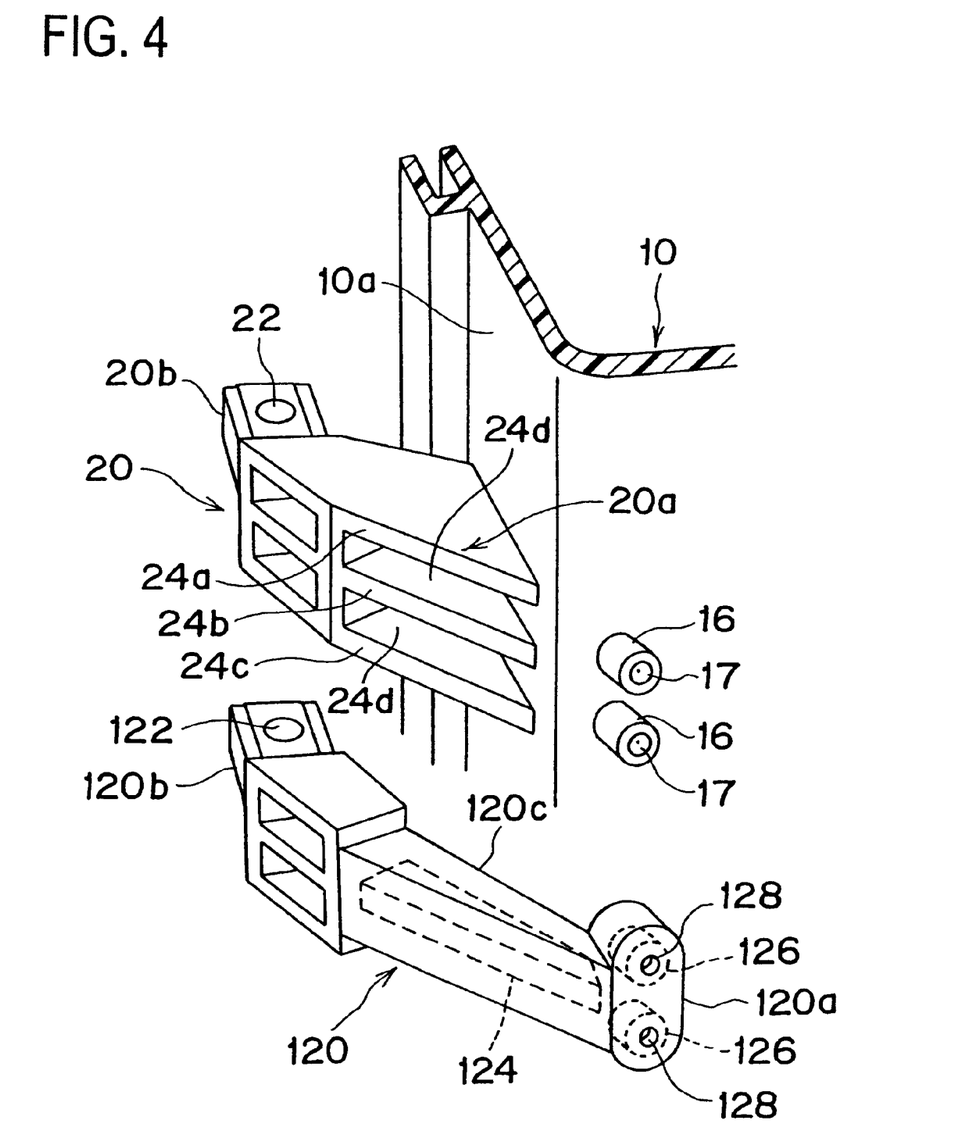
FIG. 4 is a perspective view of the bracket formed on the side wall of the headlamp, the first replacement bracket being shown next to the bracket.

As best seen from FIG. 4, the first bracket 20 provided on the right sidewall 10a of the lamp body 10 projects sideways and then extends forward, thus having a horizontal cross-section in the form of, somewhat, the symbol "<". The second bracket 30 provided on the upper wall 10b of the lamp body 10 projects upward and then extends horizontally and toward the obliquely left rear side (see FIG. 1).

A base end portion 20a of the first bracket 20 is formed so as to project from the lamp-body sidewall 10a and has three horizontal ribs 24a, 24b and 24c. These horizontal ribs 24a, 24b and 24c which are for securing the strength of the bracket 20 are, as best seen from FIG. 4, arranged in the vertical direction and extend parallel to each other. The first bracket 20 has a front end portion 20b, and a bolt insertion hole 22 that extends in a vertical direction is opened in the front end portion 20b. The front end portion 20b is continuous with the base end portion 20a of the first bracket 20.

On the other hand, the second bracket 30 is formed so as to project from the lamp-body upper wall 10b and comprises a base end portion 30a and an intermediate portion 30c that extends from the base end portion 30a, and a disc-like end portion 30b that is provided at the end of the intermediate portion 30c. A bolt insertion hole 32 is opened in the end portion 30b so as to extend in the vertical direction.

Figure 3:
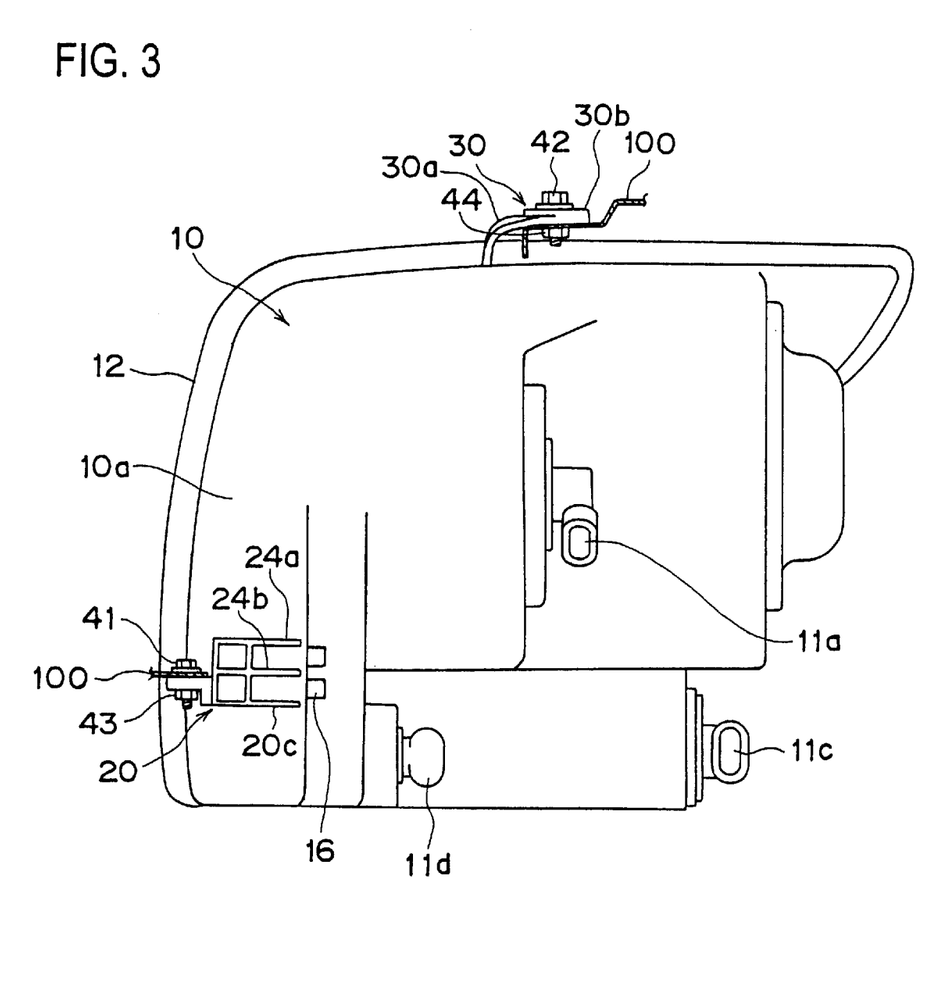
FIG. 3 is a right side view thereof.

The brackets 20 and 30 are respectively fixed to the vehicle body 100 by fastening bolt 41 and nut 43 and by fastening bolt 42 and nut 44 as seen from FIG. 3.

As seen from FIG. 4, a pair of bosses 16 for attaching a replacement bracket are provided behind the bracket 20 so as to project from the lamp-body sidewall 10a. Each of the bosses 16 is integrally formed on the lamp body 10. A shallow boss hole that 17 has a bottom thus being a recess used as a reference for screwing a tapping screw is formed in an end portion of each one of the bosses 16.

The reference numeral 120 in FIG. 4 denotes a replacement bracket that is used as a replacement of the first bracket 20 when the first bracket 20 is damaged. The replacement bracket 120 is formed substantially in the same shape as that of the bracket 20, except for the peripheral area of a base end portion 120a that is to be attached to the boss 16.

More specifically, the replacement bracket 120 is an integrally formed element made from the same synthetic resin (such as polypropylene) as the lamp body 10. The replacement bracket 120 is comprised of a base end portion 120a, an arm-shaped extended portion 120c and a front end portion 120b. The arm-shaped extended portion 120c continuously extends from the base end portion 120a that is to be attached to the lamp body 10 (boss 16). The front end portion 120b is fixed to the vehicle body 100. The front end portion 120b is formed with a bolt insertion hole 122 that vertically extends and has the same size as that of the bolt insertion hole 22 of the first bracket 20.

The base end portion 120a of the replacement bracket 120 is formed with boss engagement sections 126 that are empty spaces to be fitted on the bosses 16 formed on the lamp body 10. A tapping screw insertion hole 128 is formed in the bottom portion of each of the boss engagement sections 126.

Furthermore, a slit 124 is formed in a front face (the side facing the lamp-body sidewall 10a) of the extended portion 120c of the replacement bracket 120. The slit 124 receives the central horizontal rib 24b that constitutes the base end portion 20a of the first bracket 20. Walls located above and below the slit 124 in the extended portion 120c have the thickness so that such walls engage with horizontal spaces 24d and 24d that are between the horizontal ribs 24a, 24b and 24c.

Figure 5:
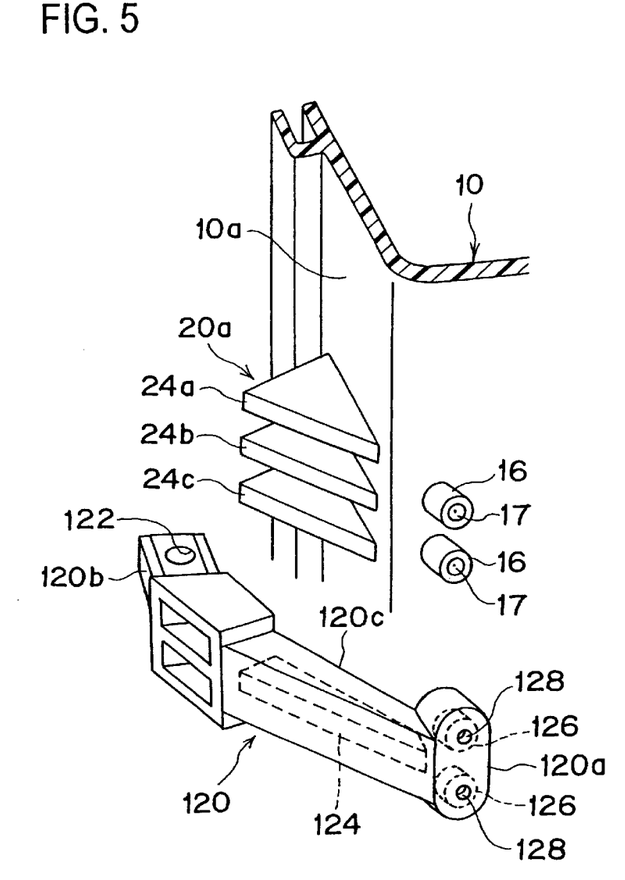
FIG. 5 illustrates the manner of attaching the replacement bracket in replace of the bracket.

With the arrangement above, when the first bracket 20 is damaged, the bracket 20 is, as seen from FIG. 5, cut out using, for example, a cutter so that the horizontal ribs 24a, 24b and 24c are shaped into triangle. Alternatively, other portions of the first bracket 20 are cut out so that only the central horizontal rib 24b in a triangle shape is left. Then, the boss engagement sections 126 in the base end portion 120a of the replacement bracket 120 are fitted on the bosses 16, and the extended portion 120c is positioned so that the slit 124 engages the horizontal rib 24b. Subsequently, tapping screws 40 are screwed into the boss holes 17 through the insertion holes 28 and pressed and screwed into the bosses 16 as seen from FIG. 6. Thus, the replacement bracket 120 is attached to the lamp body 10 (or to the bosses 16).

Figure 6:
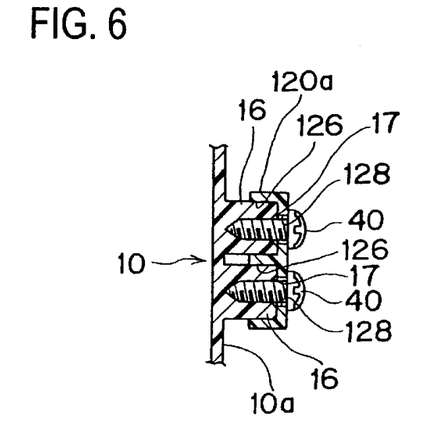
FIG. 6 is a cross-sectional view of the boss formed on the side wall of the headlamp to which the first replacement bracket is attached.

The front end portion 120b of the replacement bracket 120 is fixed to the vehicle body 100. Therefore, while the headlamp weight imposed on the replacement bracket 120 attached to the lamp body 10 is supported by the base end portion 120a (the portion fixed to the boss 16), the weight is also supported by the extended portion 120c via the slit 124 (the portion that is engaged with the horizontal rib 24b). Thus, the entire triangle contact portion between the horizontal rib 24b and the surface defining the slit 124 of the extended portion 120c becomes a supporting surface that supports the headlamp weight.

In other words, most of the headlamp weight is supported by the extended portion 120c, and almost no headlamp weight is imposed on the fixation portion that is where the base end portion 120a is attached to the boss 16. Accordingly, the headlamp weight load imposed on the base end portion 120a (that is the fixation portion of the replacement bracket 120 attached to the boss 16) is significantly small. As a result, a sufficient attachment strength of the replacement bracket 120 (durability of the replacement bracket 120) to the lamp body 10 is obtained.

Figure 7:
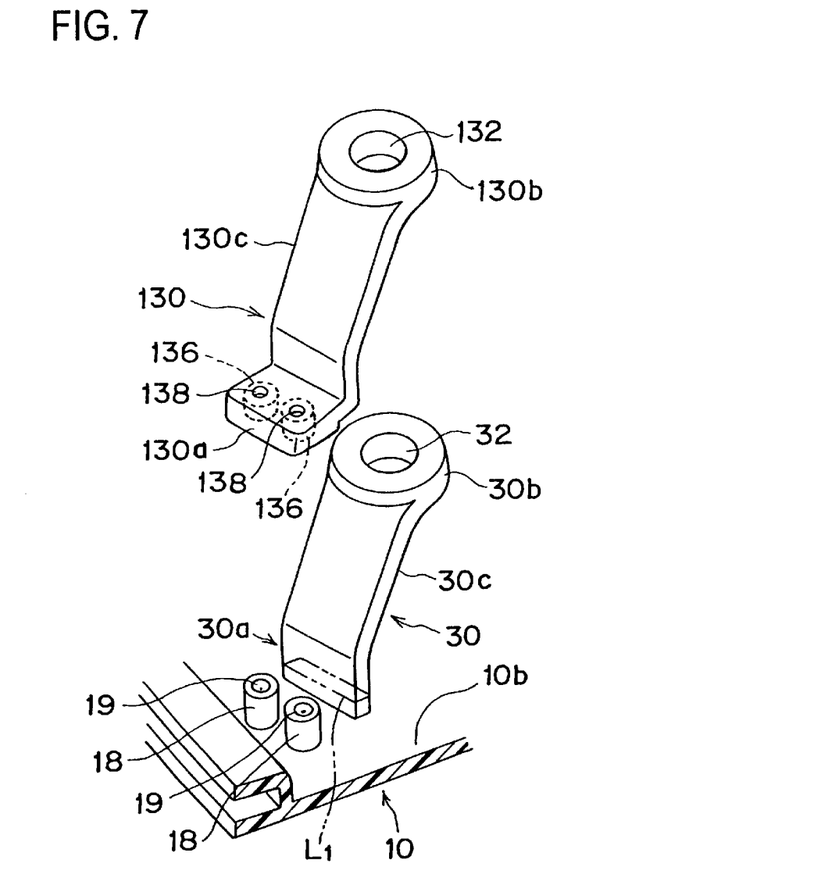
FIG. 7 is a perspective view of the bracket formed on the top wall of the headlamp, the second replacement bracket being shown next to the bracket.
Figure 8:
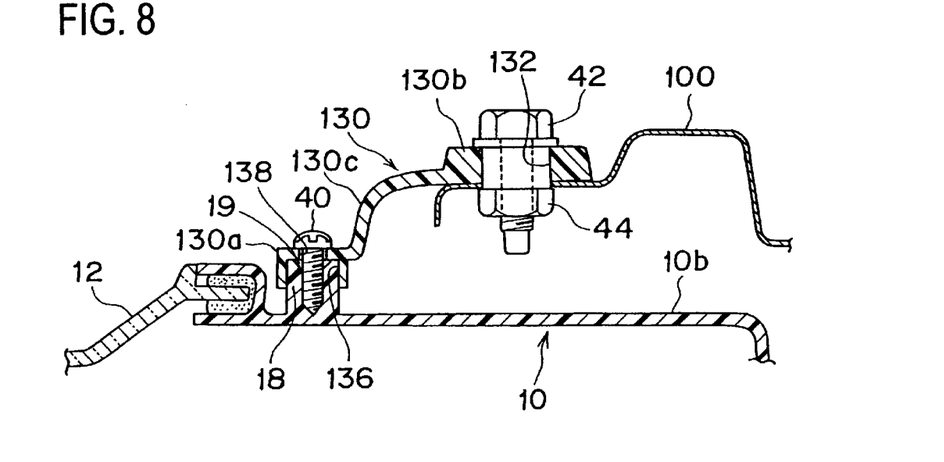
FIG. 8 is a cross-sectional view of the boss formed on the top of the headlamp to which the second replacement bracket is attached.

FIG. 7 shows the second bracket 30 and a replacement bracket 130. As seen from FIG. 7, a pair of bosses 18 for attaching the replacement bracket 130 are formed in front of the standing portion of the second bracket 30 so as to project from the upper wall 10b. Each of the bosses 18 is integrally formed on the lamp body 10. A shallow boss hole 19 that has a bottom thus being a recess used as a reference for screwing a tapping screw is formed in an end portion of each one of the bosses 18.

Like the replacement bracket 120, the replacement bracket 130 is an integrally formed element made from the same synthetic resin (such as polypropylene) as the lamp body 10. The replacement bracket 130 is comprised of a tongue-shaped base end portion 130a, an extended portion 130c and a disc-like end portion 130b. The extended portion 130c continuously extends from the tongue-shaped base end portion 130a that is to be fixed to the lamp body 10 (boss 18). The disc-like end portion 130b is formed at the end of the extended portion 130c and is fixed to the vehicle body 100. The extended portion 130c is in the same shape as that of the intermediate portion 30c of the second bracket 30. A bolt insertion hole 132 is formed in the end portion 130b of the replacement bracket 130. The bolt insertion hole 132 vertically extends and has the same size as that of the bolt insertion hole 32 of the second bracket 30.

The base end portion 130a of the replacement bracket 130 is formed with boss engagement sections 136 that are empty spaces to be fitted on the bosses 18 formed on the lamp body 10. A tapping screw insertion hole 138 is formed in the bottom portion of each one of the boss engagement sections 136.

With the arrangement above, when the second bracket 30 is damaged, the bracket 30 is, as seen from FIG. 7, cut with, for example, a cutter along the imaginary line L1 near the root portion of the standing portion 30a and removed so as not to be an obstacle for attaching the replacement bracket 130. Then, the boss engagement sections 136 in the base end portion 130a of the replacement bracket 130 are fitted on the bosses 18. Subsequently, tapping screws 40 are screwed into the boss holes 19 through the insertion holes 138 and pressed and screwed into the bosses 18. Thus, the replacement bracket 130 is attached to the lamp body 10 (or to the bosses 18).

As seen from the above, when a vehicle collision occurs, but a headlamp (lamp body 10) remains undamaged due to small impact and only the bracket 20 (and/or 30) is damaged, then the bracket 20 (and/or 30) is cut out with a part thereof left, and the replacement bracket 120 (and/or 130) is attached to the bosses 16 (and/or 18). Thus, it is not necessary to replace the entire headlamp (or the lamp body 10).

In the above structures, the shallow boss holes 17 and 19 formed in the bosses 16 and 18 have a conical shape. Accordingly, when screwing the tapping screws 40 having sharp ends into the boss holes 17 and 19, the end of each tapping screws 40 is guided to the center of the each of the boss holes 17 and 19 by the inner peripheral surface formed in each of the boss holes 17 and 19, and the tapping screws 40 are inserted straight into the bosses 16 and 18 and screwed. Therefore, no crack occurs in the bosses 16 and 18, and the attachment strength is not greatly reduced between the replacement brackets 120 and 130 and the bosses 16 and 18 even when whitening due to plastic deformation occurs in the bosses 16 and 18.

Figure 9A:
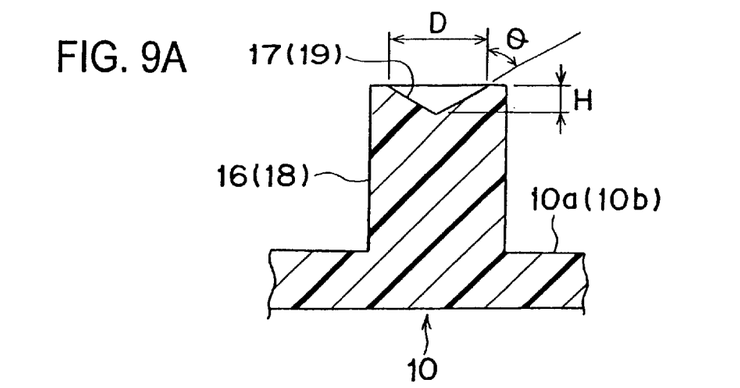
FIG. 9A is an enlarged cross-sectional view of the boss before the replacement bracket is attached thereto.
Figure 9B:
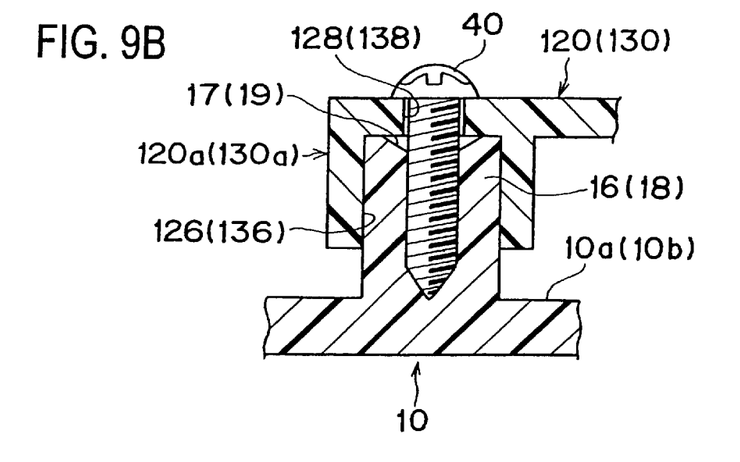
FIG. 9B is an enlarged cross-sectional view of the boss after the replacement bracket is attached thereto.

As seen from FIG. 9A, the ratio of the depth H to the bore diameter D of each of the shallow boss holes or recesses 17 and 19 is set as H/D=½, and thus the end of each tapping screws 40 is accurately guided to the center of each of the boss holes 17 and 19. In addition, the taper angle θ of the boss hole inner peripheral surface of each of the boss holes 17 and 19 having a small depth thus being a shallow recess is set to be 45 degrees. Accordingly, it is less likely that that water, gravel, mud, and the like would accumulate in the boss holes 17 and 19 and clog them Moreover, the depth H of the boss holes 17 and 19 is small as described above. Accordingly, projections for forming the boss holes 17 and 19 can be easily provided by, for example, welding in a metallic mold that is used for molding the lamp body. Therefore, unlike prior art, there is no such troublesome and difficult process involved as setting thin and long pins in the mold, and the structure of the mold can be simple, thus being advantageous in terms of cost.

Figure 10:
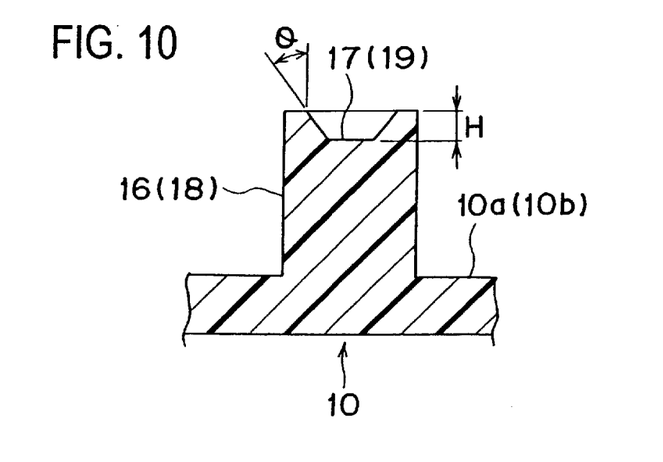
FIG. 10 is an enlarged cross-sectional view of the boss for attaching a replacement bracket thereto according to the second embodiment of the present invention.

FIG. 10 shows a boss for attaching a replacement bracket according to the second embodiment of the present invention.

In the second embodiment, the boss hole or recess 17 (19) formed in the end portion of the boss 16 (18) has a truncated conical shape. The taper angle θ of the inner peripheral surface of the truncated conical recess 17 (19) is set to be 45 degrees. Accordingly, it is less likely that water, gravel, mud, and the like would accumulate in the boss hole and clog it.

With a use of this boss hole 17 (19) shown in FIG. 10, the same advantages as in the first embodiment as described above are obtained.

Figure 11:
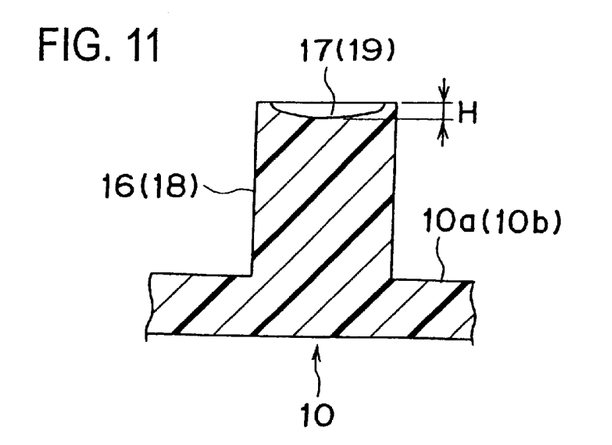
FIG. 11 is an enlarged cross-sectional view of the boss for attaching a replacement bracket thereto according to the third embodiment of the present invention.

FIG. 11 shows a boss for attaching a replacement bracket according to the third embodiment of the present invention.

In this third embodiment, the boss hole or recess 17 (19) formed in the end portion of the boss 16 (18) has a shallow mortar-like shape. With a use of this mortar-like shape recess 17 (19) shown in FIG. 11, the same advantages as in the first embodiment as described above are obtained.

Figure 12:
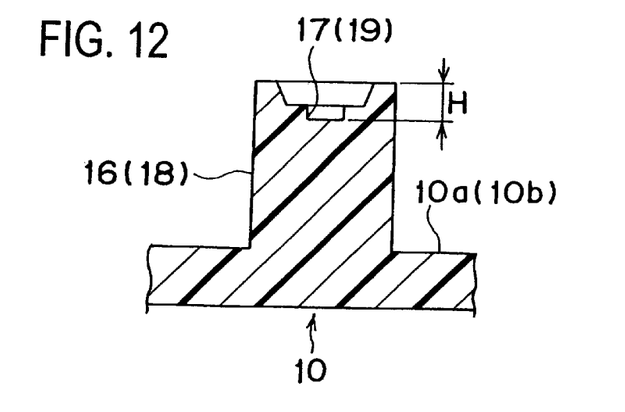
FIG. 12 is an enlarged cross-sectional view of the boss for attaching a replacement bracket thereto according to the fourth embodiment of the present invention.

FIG. 12 shows a boss for attaching a replacement bracket according to the fourth embodiment of the present invention.

In this fourth embodiment, the boss hole or recess 17 (19) is formed so that the portion near the opening has a truncated conical shape as in the boss hole of the second embodiment, and the portion near the center of the bottom has a columnar shape. With a use of this truncated conical shape and columnar shape recess 17 (19) shown in FIG. 12, the same advantages as in the first embodiment as described above are obtained.

Figure 13:
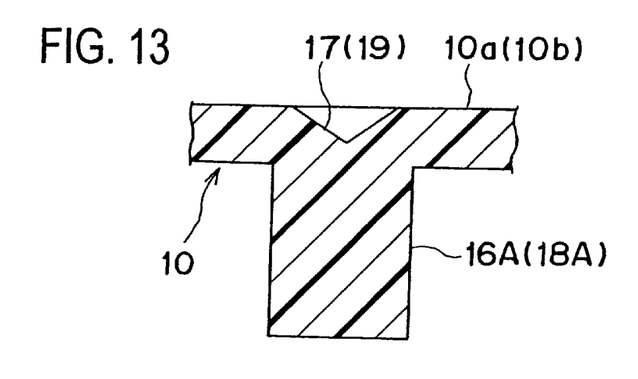
FIG. 13 is an enlarged cross-sectional view of the boss for attaching a replacement bracket thereto according to the fifth embodiment of the present invention.

FIG. 13 shows a boss for attaching a replacement bracket according to the fifth embodiment of the present invention.

In the fifth embodiment, a boss 16A (18A) that has a boss hole or recess 17 (19) therein is formed so as to protrude inside the lamp body 10. The boss hole 17 (19) has a conical shape as in the first embodiment. With a use of this conical shape recess 17 (19) shown in FIG. 13, the same advantages as in the first embodiment as described above are obtained.

The above embodiments are described with reference to the replacement brackets 120 and 130 that are used for attaching the headlamp to a vehicle body. However, the present invention is applicable to brackets that are used for mounting other vehicle lamps and bumpers to a vehicle body.

Furthermore, though the above embodiments are described with reference to a headlamp to be fixed to a vehicle body, it is needless to say that the present invention is widely applicable to headlamps to be fixed to adjacent lamps (fog lamp, for instance) and to bumpers.

As is apparent from the above description, according to the present invention, it is less likely that mud, gravel, waste, and the like accumulate in the boss hole to block and make it difficult to press and screw the tapping screw thereinto. Tapping screws can be easily screwed straight into the boss, and sufficient attachment strength is ensured for the replacement bracket. Second, unlike the conventional structures, a long pin for forming a boss hole does not need to be provided in the metallic mold for molding the lamp body. Therefore, the structure of the metallic mold can be simplified. Third, the positional restriction in providing the boss on the lamp body is small, and the replacement bracket is fixed in the optimal position on the lamp body that has a high attachment strength. Therefore, a bracket(s) which is not easily damaged by impact and which is capable of sufficiently resisting the impact can be obtained. Thus, the durability of lamps can be improved.

Since the tapping screw can be pressed and screwed straight into the boss in the present invention, no crack occurs in the boss. An attachment strength that is substantially equal to that obtained in the conventional case where the tapping screw is pressed and screwed into a narrow and long boss hole is thus obtainable. Accordingly, the attachment strength is not lower than that of the replacement bracket having the conventional structure.

Furthermore, according to the present invention, since the tapping screw can be pressed and screwed straight into the boss, the replacement bracket can be easily attached to the lamp body. In addition, since it becomes easy to make the metallic mold, the cost of the lamp can be reduced.

In addition, according to the present invention, the ratio H/D of the depth H of the boss hole to the bore diameter D thereof is set to a value in the range of ¼<H/D<⅜. Therefore, water, gravel, mud, and the like would not accumulate in the boss hole, and the boss hole is prevented from being clogged. Moreover, the structure of the metallic mold for forming a lamp body that has boss hole does not need to be complicated for forming such boss hole.

Also, according to the present invention, the taper angle θ of the inner peripheral surface of the boss hole is set to a value in the range of 20 degrees<θ<60 degrees. Therefore, water, gravel, mud, and the like would not accumulate in the boss hole, and the boss hole is prevented from being clogged. Moreover, since the center of the tapping screw can be easily aligned with the center of the boss hole, the replacement bracket can be quickly and securely attached to the boss as soon as the replacement bracket needs to be mounted on the lamp body.

Furthermore, in the present invention, the lamp weight load imposed on the fixation portion of the replacement bracket, which is attached to the boss, is small. Therefore, the durability of the replacement bracket is improved.

What is claimed is:

1. A vehicle lamp comprising:
   a synthetic resin lamp body;
   a bracket that projects from an exterior surface of said lamp body and functions as a fixation portion to be fixed to a vehicle body, an adjacent lamp and the like; and
   a boss which is provided near said bracket and is used for attaching a replacement bracket thereon so as to replace said bracket when said bracket is damaged, said boss having a recess formed therein so that a tapping screw is pressed and screwed into said recess, wherein
   a bore diameter of said recess is gradually increased from a bottom thereof to an open end thereof.

2. The vehicle lamp according to claim 1, wherein said recess is formed in a conical shape.

3. The vehicle lamp according to claim 1, wherein a depth and bore diameter ratio of said recess is set in a range of ¼<H/D<⅜ wherein H is a depth of said recess and D is a bore diameter of said recess.

4. The vehicle lamp according to claim 1, wherein a taper angle θ of an inner peripheral surface of said recess is set in a range of 20 degrees<θ<60 degrees.

5. The vehicle lamp according to claim 1, wherein said bracket is provided at a base portion thereon with a horizontal rib that projects perpendicularly from said lamp body, said replacement bracket is provided with a slit that is engageable with said horizontal rib, and said replacement bracket is attached to the said boss with said slit being engaged with said horizontal rib.

6. The vehicle lamp according to claim 5, wherein said slit of said replacement bracket is provided between a base end portion of said replacement bracket and a front end portion of said replacement bracket, said base end portion being attached to said boss of said lamp body and said front end portion being fixed to said vehicle body.

7. The vehicle lamp according to claim 2, wherein a depth and bore diameter ratio of said recess is set in a range of ¼<H/D<⅜ wherein H is a depth of said recess and D is a bore diameter of said recess.

8. The vehicle lamp according to claim 7, wherein a taper angle θ of an inner peripheral surface of said recess is set in a range of 20 degrees<θ<60 degrees.

9. The vehicle lamp according to claim 8, wherein said bracket is provided at a base portion thereon with a horizontal rib that projects perpendicularly from said lamp body, said replacement bracket is provided with a slit that is engageable with said horizontal rib, and said replacement bracket is attached to the said boss with said slit being engaged with said horizontal rib.

10. The vehicle lamp according to claim 9, wherein said slit of said replacement bracket is provided between a base end portion of said replacement bracket and a front end portion of said replacement bracket, said base end portion being attached to said boss of said lamp body and said front end portion being fixed to said vehicle body.

11. The vehicle lamp according to claim 2, wherein a taper angle θ of an inner peripheral surface of said recess is set in a range of 20 degrees<θ<60 degrees.

12. The vehicle lamp according to claim 3, wherein a taper angle θ of an inner peripheral surface of said recess is set in a range of 20 degrees<θ<60 degrees.

13. The vehicle lamp according to claim 7, wherein said bracket is provided at a base portion thereon with a horizontal rib that projects perpendicularly from said lamp body, said replacement bracket is provided with a slit that is engageable with said horizontal rib, and said replacement bracket is attached to the said boss with said slit being engaged with said horizontal rib.

14. The vehicle lamp according to claim 11, wherein said bracket is provided at a base portion thereon with a horizontal rib that projects perpendicularly from said lamp body, said replacement bracket is provided with a slit that is engageable with said horizontal rib, and said replacement bracket is attached to the said boss with said slit being engaged with said horizontal rib.

15. The vehicle lamp according to claim 2, wherein said bracket is provided at a base portion thereon with a horizontal rib that projects perpendicularly from said lamp body, said replacement bracket is provided with a slit that is engageable with said horizontal rib, and said replacement bracket is attached to the said boss with said slit being engaged with said horizontal rib.

16. The vehicle lamp according to claim 12, wherein said bracket is provided at a base portion thereon with a horizontal rib that projects perpendicularly from said lamp body, said replacement bracket is provided with a slit that is engageable with said horizontal rib, and said replacement bracket is attached to the said boss with said slit being engaged with said horizontal rib.

17. The vehicle lamp according to claim 3, wherein said bracket is provided at a base portion thereon with a horizontal rib that projects perpendicularly from said lamp body, said replacement bracket is provided with a slit that is engageable with said horizontal rib, and said replacement bracket is attached to the said boss with said slit being engaged with said horizontal rib.

18. The vehicle lamp according to claim 4, wherein said bracket is provided at a base portion thereon with a horizontal rib that projects perpendicularly from said lamp body, said replacement bracket is provided with a slit that is engageable with said horizontal rib, and said replacement bracket is attached to the said boss with said slit being engaged with said horizontal rib.

19. The vehicle lamp according to claim 14, wherein said slit of said replacement bracket is provided between a base end portion of said replacement bracket and a front end portion of said replacement bracket, said base end portion being attached to said boss of said lamp body and said front end portion being fixed to said vehicle body.

20. The vehicle lamp according to claim 16, wherein said slit of said replacement bracket is provided between a base end portion of said replacement bracket and a front end portion of said replacement bracket, said base end portion being attached to said boss of said lamp body and said front end portion being fixed to said vehicle body.

* * * * *